United States Patent
Krimstock et al.

(10) Patent No.: US 12,177,922 B2
(45) Date of Patent: Dec. 24, 2024

(54) MOBILE PHONE OPEN-ENDED RECONNECT FEATURE

(71) Applicant: Avaya Management L.P., Durham, NC (US)

(72) Inventors: Roger I. Krimstock, Boulder, CO (US); Kevin Archer, Brighton, CO (US); Rusty Nelson, Brighton, CO (US)

(73) Assignee: Avaya Management L.P., Durham, NC (US)

( * ) Notice: Subject to any disclaimer, the term of this patent is extended or adjusted under 35 U.S.C. 154(b) by 236 days.

(21) Appl. No.: 17/695,432

(22) Filed: Mar. 15, 2022

(65) Prior Publication Data

US 2023/0300933 A1 Sep. 21, 2023

(51) Int. Cl.
*H04W 76/19* (2018.01)
*H04W 36/00* (2009.01)

(52) U.S. Cl.
CPC ........ *H04W 76/19* (2018.02); *H04W 36/0011* (2013.01); *H04W 36/0079* (2018.08); *H04W 36/03* (2018.08)

(58) Field of Classification Search
CPC ............. H04W 76/19; H04W 36/0011; H04W 36/0079; H04W 36/03
See application file for complete search history.

(56) References Cited

U.S. PATENT DOCUMENTS

| | | | |
|---|---|---|---|
| 6,633,760 B1 | 10/2003 | Ham et al. | |
| 9,674,231 B2 | 6/2017 | Chavez et al. | |
| 10,142,476 B1 | 11/2018 | Chen | |
| 10,469,655 B2 | 11/2019 | Chavez et al. | |
| 10,742,800 B2 | 8/2020 | Chavez et al. | |
| 2002/0090947 A1* | 7/2002 | Brooks | H04W 76/19 455/450 |
| 2005/0070286 A1 | 3/2005 | Awasthi et al. | |
| 2007/0274488 A1* | 11/2007 | Callaghan | H04W 76/19 379/201.01 |
| 2010/0091970 A1 | 4/2010 | Cheung et al. | |
| 2021/0185097 A1 | 6/2021 | Kinsey et al. | |
| 2022/0036005 A1 | 2/2022 | de Brebisson et al. | |

* cited by examiner

*Primary Examiner* — Jamal Javaid
(74) *Attorney, Agent, or Firm* — Sheridan Ross P.C.

(57) ABSTRACT

Communication endpoints, including but not limited to, mobile communication devices may lose connectivity with the network mid-call. If the call does not resume relatively quickly, the system resources utilized for the call will be released and become available for other calls. However, at a later time, the inadvertently disconnected endpoint may reestablish network connectivity. By providing a system that receives a signal, such as the result of an API or polling, the reconnected endpoint is detected and the call may automatically be reestablished between the communication endpoints after the call's resources have been repurposed.

20 Claims, 5 Drawing Sheets

MOBILE PHONE OPEN-ENDED RECONNECT FEATURE

FIELD OF THE DISCLOSURE

The invention relates generally to telecommunications systems and methods and particularly to establishing a call when unintentionally disconnected.

BACKGROUND

Mobile Communication System (MCS) telephony coverage is not 100%, and certainly is not "5-9s" as in the old AT&T landline days, especially when at least one of the parties on a call is moving (e.g., in a car). We get a good feel for the spottiness of mobile coverage when we go into "blind" spots (or regions). The result is all too often a dropped call, sudden stoppage of a call, perhaps in mid-word, where parties may continue talking into the ether, not knowing how much of what was said was actually heard. Typically, when the parties figure out the call was dropped, the callers (one or both) will try to re-establish the call, by dialing back the other party. If it is important, the attempts may go on for a while, an expression of futility reminiscent of pulling a "one-arm bandit," never knowing exactly when there may be a jackpot (entering into the realm of Turing Problem undecidability). This is problematic for many reasons, but not the least of which is a vehicle driver, still in the blind spot/region, trying to call the other party back and, thereby, diverting attention from driving and increasing risks.

Prior art communication systems often include some form of automatic reconnect capabilities. For example, U.S. Pat. No. 6,633,760 to Ham et al., filed on Dec. 3, 1999, entitled "Method for Reconnection of a Dropped Call in Mobile Communication System", (the "'706 patent") which is herein incorporated by reference in its entirety and for all that it teaches, is focused on the physical parts of the mobile communication system, namely transceivers and base stations, "connected" to the two (or more) parties. When a disconnect detection occurs (i.e., a detected disruption of the radio connection), a reconnect can be initiated, but only within a short period of time (e.g., within five seconds). Such a reconnect occurs between equipment only and without engaging the other party. The goal is to reconnect the call, between the parties who are unaware that the call was momentarily dropped, and generally preserving channels, etc., of the original call.

In the '760 patent, the mobile communication system handles the radio communication between base stations and mobile phones and, therefore, can easily determine an unintentional disconnected call characterized by a disruption in the radio communication, and then proceed to reconnect the call in real-time, if possible, while remaining transparent to the parties of the call.

In another prior art communication system, as described in U.S. Patent Publication 2005/0070286 to Awasthi et al., filed on Sep. 30, 2003, entitled "System and Method for Reconnecting Dropped Cellular Phone Calls" (the "'286 application"), which is herein incorporated by reference in its entirety and for all that it teaches, is focused on reconnecting dropped cellular phone calls to/from an agent and generally limited to a controlling PBX environment, such as a call center. In one difference from the '706 patent, if a reconnect fails, the '286 application directs the calling party to voice mail.

In U.S. application Ser. No. 17/545,208 to Mendiratta et al., filed on Dec. 8, 2021, entitled, "Methods and Systems for Reconstructing Communication Sessions Using Natural Language Processing" (the "'208 application"), which is herein incorporated by reference in its entirety and for all that it teaches, provides a Context Aware Call Rebuilding (CACR) that is also directed to detecting and reconnecting unintentional disconnected calls of an agent at a call center. The reconnecting process comprises attempting to rebuild the call in real-time while maintaining system resources for the call, in anticipation that such call will resume.

SUMMARY

Despite the advantages provided by the prior art, problems remain. More specifically, the foregoing limitations and other needs are addressed and advanced by the various embodiments and configurations provided by the present invention. The present invention can provide a number of advantages depending on the particular configuration. These and other advantages will be apparent from the disclosure of the invention(s) contained herein.

Real-time rebuilding of an unintentionally disconnected call, such as those described in the art identified above, are not always successful in reconnecting the parties. As provided herein, when a call is unintentionally disconnected versus intentionally ended or terminated, an enhanced, hands-off reconnection is performed when both/all parties are again available, such as when a party that was disconnected due to entering a "blind spot" is subsequently able to conduct mobile communications. The embodiments herein build upon MCS and CACR, which perform real-time reconnections only, such as to extend reconnection functionality beyond real-time to enable reconnection at any time.

In one embodiment, a "reconnect-anytime application" is provided having functionality in a loose coupling with components of the current mobile communication system. When a call is dropped, the "mobile communication system" (mobile stations and base stations via transceivers) detects the drop and determines whether the drop was "unintentional" and, if so, attempts to reconnect in real-time. However, if the real-time reconnection attempts time-out at a predetermined time limit (such as may be indicated by counting reconnect attempts), additional actions are taken to automatically, and without requiring human intervention or input, reconnect the call after the systems and processes that perform real-time reconnection of disconnected calls, if implemented, have timed out.

In another embodiment, prior art systems and processes are utilized that perform automatic detection of the unintentional disconnected calls. For example, the mobile communication system may detect the unintentional disconnection and then time-out while attempting to perform a real-time reconnection. At that point, systems and methods described herein are utilized to perform a subsequent reconnection. When the call has been released, one or more embodiments described herein may be initiated by receiving sent data associated with the call, including both the calling and called parties' phone numbers, when the call is released from the mobile communication system.

In another embodiment, once a dropped call is determined, the "other party" (i.e., the party/parties that are was/were not unintentionally disconnected) will be notified and offered the option of re-establishing the call (utilizing different mobile resources, e.g., channels). The notification may be performed via a call or, optionally, a different channel such as text message, email, or signal to a communication management application. If accepted, and if both/all parties are utilizing mobile phones, the application will poll the home location registries associated with the mobile switching centers to see if both numbers are now registered, which of course means that the "out of coverage" mobile station of the disconnected party has been reconnected with the mobile communication system. Then, when both/all parties' mobile devices are again in coverage, the application (in one embodiment) calls both mobile stations. As a further option, the calling application plays a message to announce that the previously dropped call may now continue and, as a further option, may allow for voice prompts to enable the user to agree and, as a result, the call is reestablished "hands free." As a benefit, and in the less likely case that both mobile stations are inaccessible after the dropped call, a positive response from one of the parties is not necessary and may be omitted prior to beginning its' polling process. When both/all phones are in coverage, the application calls each mobile station, optionally plays the original option to reconnect, and if either party answers "no," drops the calls. If the "other party" is a landline, then only the home location registry for the mobile device needs to be consulted and the call is placed to the landline with no further verification required. It should be appreciated that polling is one means by which a signal is received indicating that an unintentionally disconnected mobile device is now available to reestablish the call. Other signaling means, such as an application programming interface (API) which may be a process, daemon, etc. executing on a processor of a component of a mobile network and/or mobile device, may also be utilized to provide a signal indicating that the mobile device is again present on the network.

Embodiments include one or more configurable options for mobile stations, such as the ability to bypass the request to reconnect all dropped calls or to choose to reconnect for each dropped call (as above). Embodiments may include managing attempts to reconnect all dropped calls (making it a de facto component of the mobile communication system) or a proper subset for mobile stations that have subscribed to, or otherwise enabled, the feature. In either case, the application, or the functionality thereof, may be located "inside" the mobile communication system or "outside" the mobile communication system, such as the CACR, and each providing a signaling service, such as a notification from APIs, for dropped calls. Embodiments may also include installation on a mobile device itself. If the reconnection process is limited to subscribers, then the application consults a subscription list for each dropped call and excludes reconnecting to non-subscribers. When the reconnection process is limited to subscribers, then the application consults a subscription list for each dropped call with at least one subscriber, and, in one embodiment, if the subscriber is the originator, then when the other participant(s) are not subscribers, reconnection is attempted. In another embodiment, in this mixed group of subscribers and non-subscribers, when the originator is not a subscriber, but at least one of the participants is a subscriber, then the reconnection is attempted. When a subscriber is disconnected from a call the remaining participants may continue the call and be notified when the inadvertently disconnected party is able to be reconnected and, optionally, reconnected to the call.

Configurations may be provided by an administrator for one or more subscribers (each with at least one mobile device) to a mobile network for service thereon. Additionally or alternatively, individual subscribers may configure notifications independently. In one embodiment, when three or more parties are initially connected but followed by an unintentional disconnect, each mobile device may determine if all other devices have reestablished connectivity and are able to reconnect the call. If multiple mobile devices attempt to reconnect the call, then prior art solutions to resolve two or more parties simultaneously placing and receiving a call to each other may be utilized. In another embodiment, a first mobile device may poll a second mobile device's home location registry and determine that the second mobile device is currently unavailable. A third mobile device may poll the first mobile device and receive an indication therefrom that the first mobile device is available but the second mobile device is not. If less than all parties are able to be reconnected, the call may be considered as being unable to reestablish or, optionally, the parties utilizing mobile devices that are able to be reconnected may elect to reconnect with only the currently available mobile devices.

In another embodiment, configurations may be provided to limit a timeframe in which reconnecting will be attempted. Reconnection attempts may also be configured to be limited to particular hours of the day, days of the week, signal strength to the mobile network being above a threshold level, geographic location of the mobile device, etc.

In another embodiment, a disconnected party may be an endpoint of a contact center utilized by an agent to communicate with a customer. For example, transient fault in the network or call center equipment may cause a call to be dropped unintentionally. In response, a signal is received that a call has unintentionally disconnected. Detecting unintentional disconnections is known in the prior art. However, the state of the art is advanced by certain embodiments herein (which may be described with respect to mobile devices) which allow for a call to be reestablished at a time beyond which a real-time reconnection is possible. For example, a call may be reestablished automatically upon receipt of a signal, such as the agent's endpoint being reconnected, the fault being resolved, etc. Reconnection may be customized by a call center administrator and/or the agent, such as to override reconnection (e.g., when a call was essentially complete), reconnecting to the same agent only, reconnecting to the next available agent, reconnection that is limited to or excluding certain hours, days, etc.

In another embodiment, a method for non-real time reestablishment of an unintentionally disconnected call is disclosed, comprising: receiving a first signal indicating that a first call, between a mobile communication device and a second communication device, was unintentionally disconnected by the mobile communication device losing connectivity with the mobile communications network and real-time attempts to re-establish the call have been terminated unsuccessfully; after receiving the first signal, receiving a second signal indicating the mobile communication device is connected to the mobile communications network; and in response to receiving the second signal, initiating a reconnect process to establish a second call between the mobile communication device and the second communication device.

In another embodiment, a system is disclosed, comprising: a network interface to a communications network; a processor configured to execute instructions maintained in a non-transitory memory; receiving a first signal indicating that a first call, between the communication device and a second communication device, was unintentionally disconnected by network interface losing connectivity with the communications network and real-time attempts to re-establish the call have been terminated unsuccessfully; after receiving the first signal, receiving a second signal indicating the network interface is connected to the communications network; and in response to receiving the second signal, initiating a reconnect process to establish a second call between the communication device and the second communication device.

In another embodiment, a system for non-real time reestablishment of an unintentionally disconnected call is disclosed, comprising: a processor configured to execute instructions maintained in a non-transitory memory; a network interface communications network; and wherein the processor performs: receiving, via the network interface, a first signal indicating that a first call, between a first communication device and a second communication device, was unintentionally disconnected by a first communication device losing connectivity with the communications network and real-time attempts to re-establish the call have terminated unsuccessfully; after receiving the first signal, receiving via the network interface, a second signal indicating the first communication device has reestablished connectivity with the communications network; and in response to receiving the second signal, initiating a reconnect process to establish a second call between the first communication device and the second communication device.

A system on a chip (SoC) including any one or more of the above aspects of the embodiments described herein.

One or more means for performing any one or more of the above aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
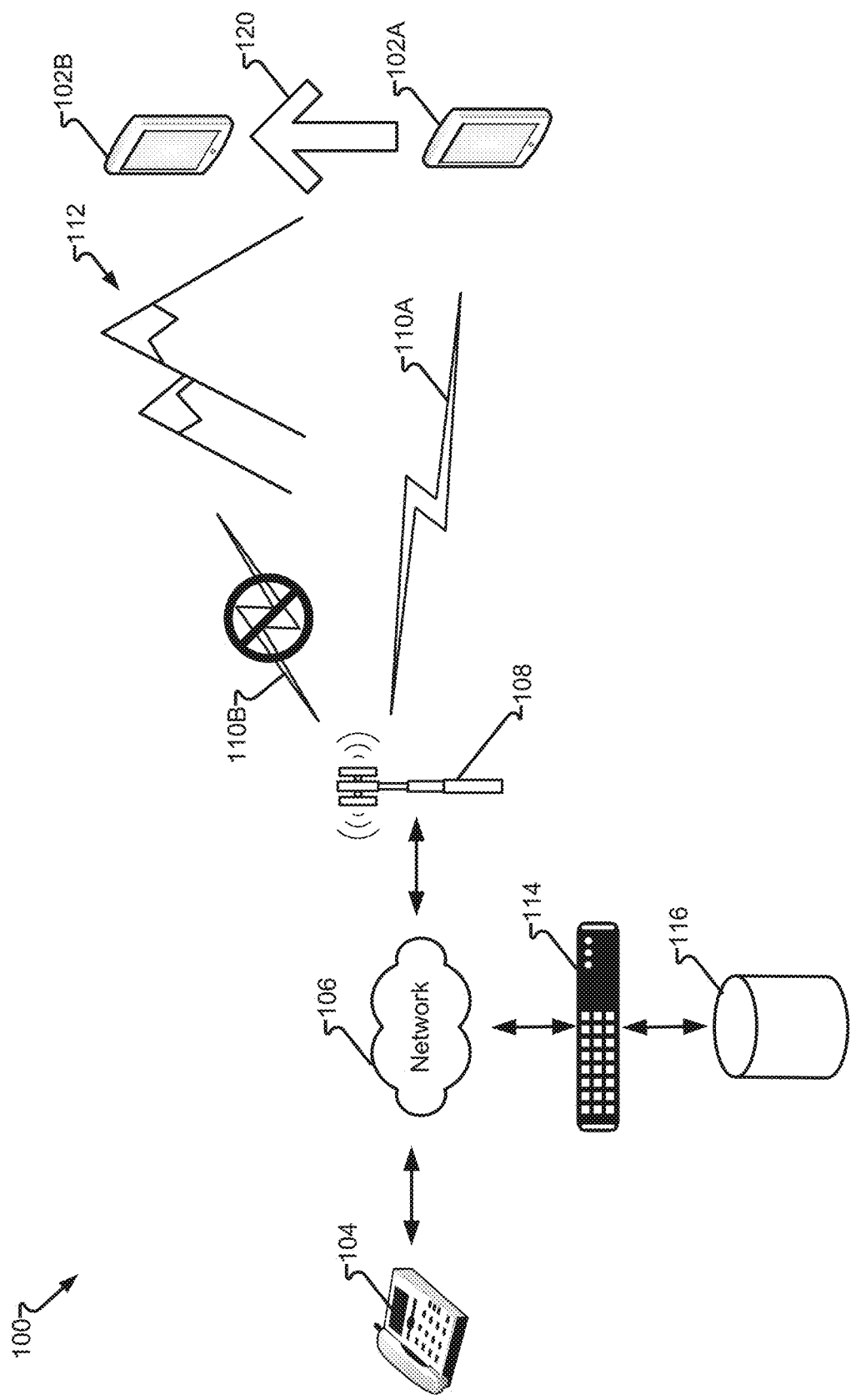
FIG. 1 depicts a system in accordance with embodiments of the present disclosure.

FIG. 1 depicts system 100 in accordance with embodiments of the present disclosure. In one embodiment, communication device 104 and communication device 102A in a first condition are engaged in a call (i.e., a real-time communication comprising the exchange of audio, video and/or text encoded for transport via network 106). Communication device 102A in a first condition communicates with cellular tower 108, which in turn is connected to a portion of network 106, via signal 110A. In some embodiments, communication device 104 is a landline (e.g., connected to a PSTN). In other embodiments, communication device 104 is a mobile device (e.g., connected to a cellular network via radio frequency communications).

However, transition 120 occurs when communication device 102A in a first condition transitions to communication device 102B in a second condition. The difference between the first condition and the second condition is any state of communication device 102 that prevents communication device 102 from maintaining signal 110A with cellular tower 108. For example, communication device 102 in a first condition has a signal with cellular tower 108 (i.e., signal 110A). However, communication device 102 is physically moved to a location comprising signal interference 112, such as between communication device 102B in a second position and cellular tower 108 to cause disrupted signal 110B. Cellular tower 108 and/or communication device 102B in a second condition may be operable to send and receive radio frequency communications but cannot receive such a signal due to signal interference 112. Accordingly, and in one embodiment, signal interference 112 may be any feature or phenomenon that interferes with radio frequency communications (e.g., mountains, hills, buildings, tunnels, excessive distance between cellular tower 108 and communication device 102, interfering transmitters, etc.). Signal interference 112 may be due to a fault in one or more of cellular tower 108 and/or communication device 102 in a second condition, such as a dead battery, being powered off, component failure, etc.

In another embodiment, when communication device 102 terminates the call with communication device 104, a determination is made as to whether or not the call was terminated intentionally or unintentionally. For example, if one or both of communication device 102 and/or communication device 104 end the call normally, such as with a Session Initiation Protocol (SIP) "BYE" message, the call is terminated normally. Similarly, an "on hook" signal for Public Switched Telephone Networks (PSTN) also indicates an intentional termination. However, if signal 110 terminates during a call, and no other indication of a disconnect is received, the call is determined to terminate unintentionally. Other means of determining whether a call has been unintentionally terminated may be utilized, such as determining that a call has terminated mid-sentence spoken by a user of communication device 102 and/or communication device 102 or otherwise determined that the user was intending to discuss more content during the call when the call terminated.

In another embodiment, server 114 and database 116 may be a portion of an MCS, such as a portion of equipment owned or maintained by a landline carrier, cellular carrier, or private carrier (e.g., Private Branch Exchange (PBX)). Calls are commonly maintained on equipment that can tolerate less than ideal connections, such as intermittent outages of signal 110, network 106, etc., as observed by packet losses or signal termination, but resumed within a short period of time (e.g., less than five seconds, less than ten seconds). Call resources (e.g., port allocation, frequency allocation, etc.)

are maintained during such outages, but only until a threshold time period is reached (e.g., more than five seconds, more than ten seconds), at which point call resources are recovered and otherwise made available for other purposes.

After the call resources have been recovered and reallocated for use by other calls, the cause of the termination may resolve. For example, signal interference 112 may terminate (e.g., the distance between cellular tower 108 and communication device 102 decreased; the path of signal 110 no longer includes a mountain, building, or other signal barrier; power has been restored; a faulty component remedied; etc.). As a result, communication device 102 may then again be in communication with cellular tower 108 or another cell tower, such as in a different communication cell. Such information is maintained as a record in a data structure, such as the home location registry which, in one embodiment, is maintained in database 116 and accessed by server 114. Additionally or alternatively, an Application Programming Interface (API) may be provided by a process running on server 114 and/or a different server to notify another process, such as a Mobile Phone Reconnect (MPR), to initiate reestablishment of the call between communication device 104 and communication device 102. In another embodiment, the MPR process polls the home location registry in database 116 and/or communication device 102.

When communication device 102 is able to continue the call, the MPR may initiate a call to communication device 104 and/or communication device 102 and provide a prompt, such as a ring tone, voice prompt, etc., to announce the call may be reconnected and automatically initiates a reconnection call or, as a further option, determine if a previously defined rule or a user prompt may be provided and, in accordance with the response, the call is placed or the process ends.

Previously determined rules, such as settings, may be provided and maintained in database 116 and/or communication device 102. The rules may include default rules that apply to all calls, unless otherwise overridden, such as to make an exception for a particular call, party operating communication device 104, etc. For example, automatically reconnecting the call utilizing the embodiments described herein, may be performed at any time after the call resources have been released and without end. However, a setting may comprise a termination value that, after which, reconnecting will not be attempted. This may be situationally based, such as when communication device 102 is known to be in a "signal dense" area but yet signal 110 is lost, as opposed to areas where signal coverage is known to be marginal, such as the fringe of a coverage area. Because of the presence of ample signals, the signal (with the same or different cellular tower 108), may still be lost, such as may occur getting on an elevator or in a signal "canyon" formed by buildings. In such locations, the signal will likely return relatively soon, such as within a few minutes. Accordingly, reconnection attempts may be limited to five or ten minutes. However, if communication device 102 is located at the limit of signal 110 and moving further away, then it may be expected that signal 110 may not return for a longer period of time (e.g., hours to weeks to indefinitely). Accordingly, attempts to reconnect may be continued for a greater period of time. As a further option, a user of communication device 102 and/or a user of communication device 104 may decline a reconnection attempt even if notified that reestablishment of the call is possible.

System 100 is generally directed to communication device 102, a mobile communication device comprising a radio frequency communication link, such as cellular phones, and communication device 104, a wired communication device (e.g., PSTN endpoint), systems utilizing other types and combinations of communication devices are also contemplated and described more completely with respect to the embodiments that follow.

Figure 2:
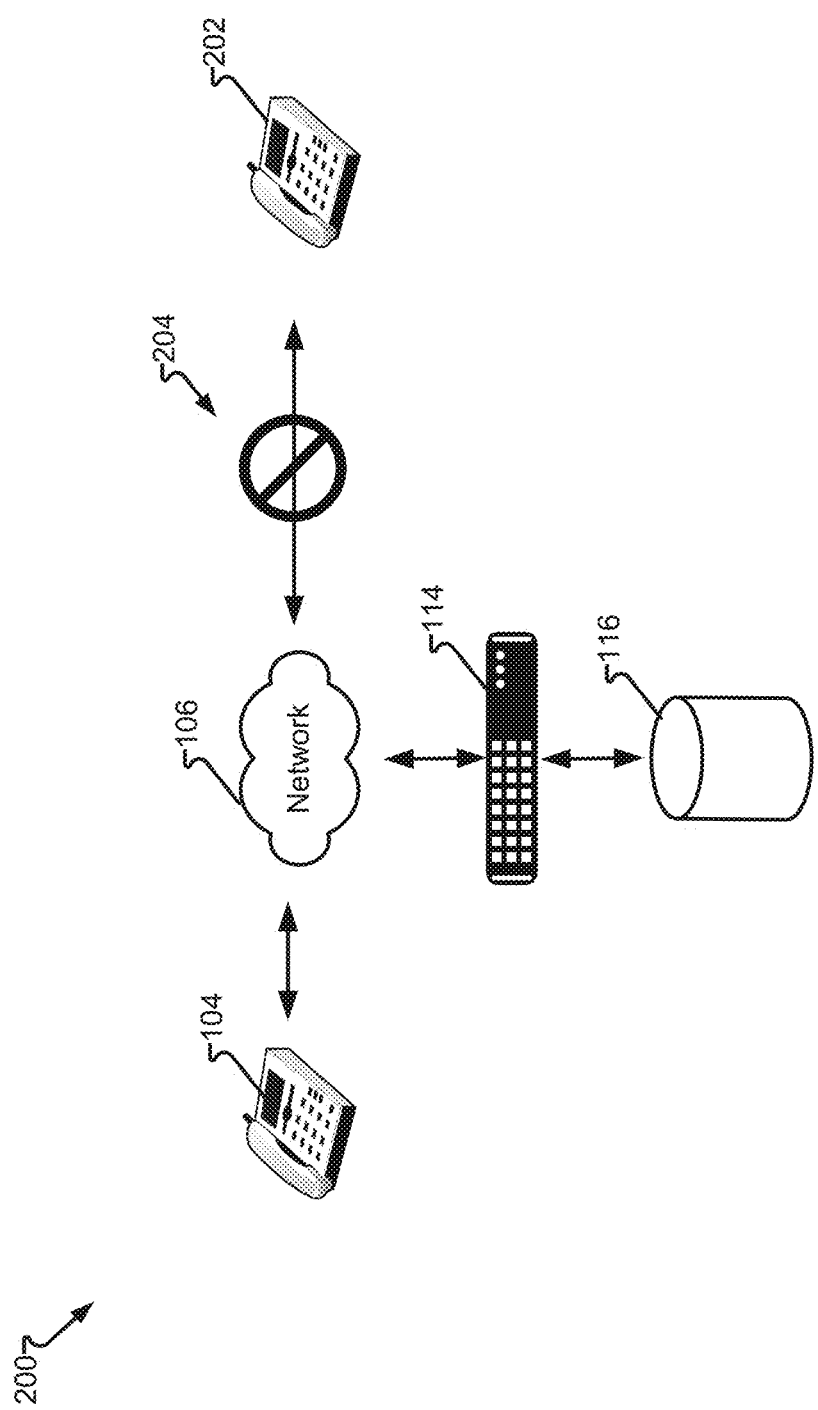
FIG. 2 depicts a system in accordance with embodiments of the present disclosure.

FIG. 2 depicts system 200 in accordance with embodiments of the present disclosure. In one embodiment, system 200 comprises communication device 104 and wired communication device 202 communicating via network 106. Wired calls may get inadvertently disconnected and such an occurrence is determined by prior art systems and methods. A signal is received indicating a call comprising communication device 104 and wired communication device 202 was inadvertently disconnected. The signal may be processed by server 114 having access to database 116.

System 200 may know when wired communication device 202 has been reconnected to network 106, such as when network 106 comprises a PBX or similar structure that monitors connections thereto. Additionally or alternatively, server 114 may report the inadvertent disconnection and/or re-connection of wired communication device 202 in a record maintained in database 116. Therefore, the record in database 116 may be monitored for indicia of reconnection of wired communication device 202 to communication link 204, such as a new record or the change of a status or presence indicator.

Once wired communication device 202 has reconnected following the inadvertent disconnect, server 114 executes a process to reestablish the call between communication device 104 and wired communication device 202. In one embodiment, each endpoint (communication device 104 and wired communication device 202) rings and, when the users thereof answer, they are connected. In other embodiments, an announcement is provided, such as a text message (which may be provided to communication device 104, wired communication device 202, and/or another device associated with users thereof). The announcement may be text, tonal, generated speech, etc. As a further option, users may be provided with a prompt to either accept or decline the reconnection. If a user of at least one of communication device 104 or wired communication device 202 declines, the process ends. However, if all users agree, the call is reestablished between communication device 104 and wired communication device 202.

Figure 3:
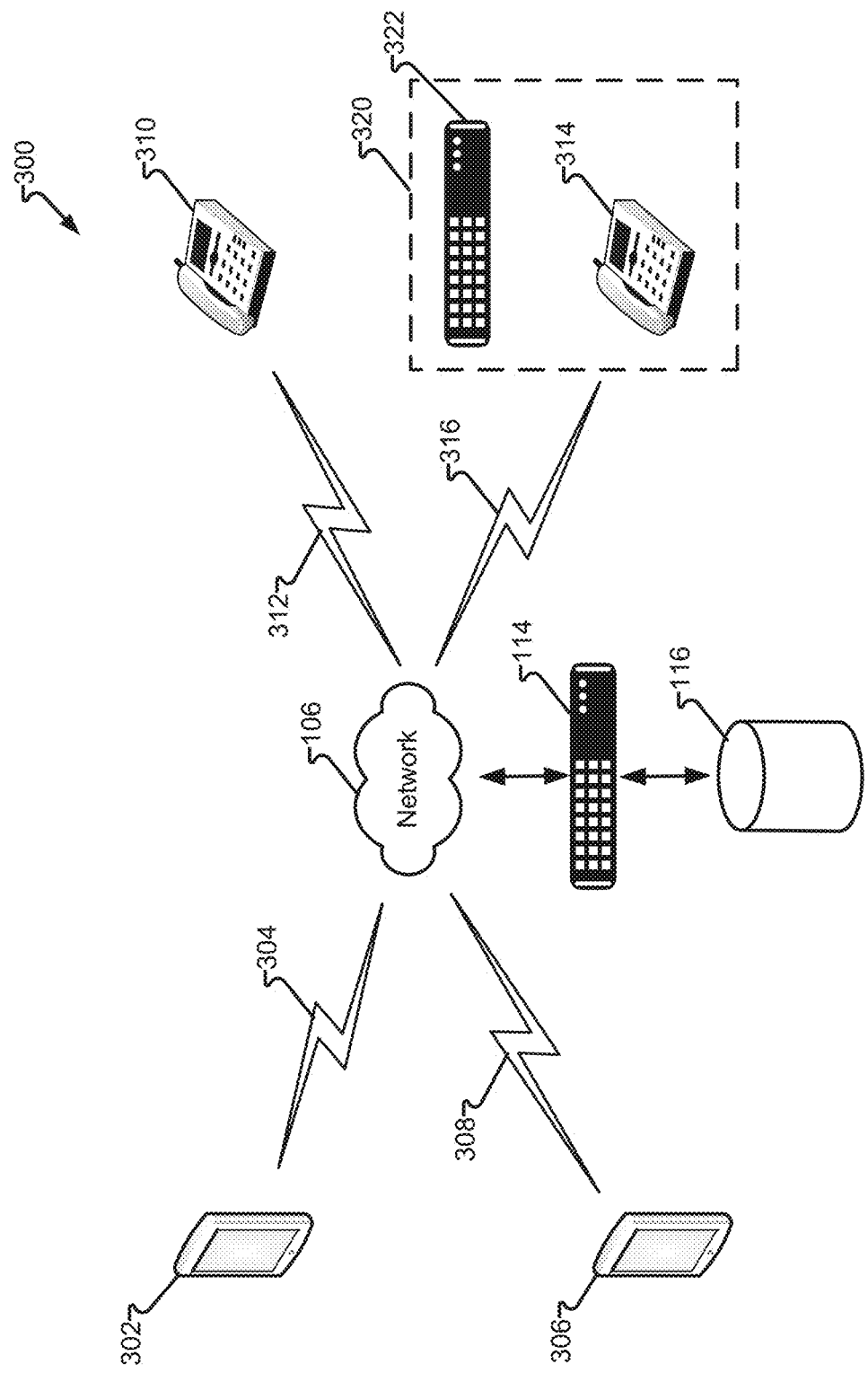
FIG. 3 depicts a system in accordance with embodiments of the present disclosure.

FIG. 3 depicts system 300 in accordance with embodiments of the present disclosure. Calls often comprise more than two communication devices. In one embodiment, system 300 illustrates a call comprising four communication devices. It should be appreciated that other network topologies and configuration of communication devices and each of their particular configurations (e.g., wired, wireless, etc.) are also contemplated by the embodiments herein.

In one embodiment, a call comprises first mobile endpoint 302 via communication link 304, second mobile endpoint 306 via communication link 308, wired communication device 310 via communication link 312, and wired communications device 314 via wired communications link 316. If any two or more of first mobile endpoint 302, second mobile endpoint 306, wired communication device 310, and wired communications link 316 are inadvertently disconnected, reestablishing the call may occur upon each endpoint (first mobile endpoint 302, second mobile endpoint 306, wired communication device 310, and wired communications link 316) becoming available. However, in other embodiments, certain endpoints may be considered optional and, if only optional endpoints remain disconnected from network 106, then reestablishment of the call may be attempted.

Similar to the embodiments described above, server 114 may comprise a process that receives a signal, via API or as a result of polling, that reconnection from an unintentional disconnect is now possible, such as when an unintentionally disconnected endpoint from network 106 has reconnected to network 106. Polling may comprise polling one or more of a record or portion of a record in database 116, polling a network component of network 106 to determine if the inadvertently disconnected endpoint(s) (and optionally the non-inadvertently disconnected endpoint(s)) is now available, polling the inadvertently disconnected endpoint directly, polling the remaining (non-inadvertently disconnected) endpoint directly, polling a mobile carrier's home registry location when the unintentionally disconnected endpoint is a mobile communication device, and/or other component having connection status for the inadvertently disconnected endpoint(s). Reconnection may be performed upon determination that all communication devices are connected to the network.

In another embodiment, wired communication device 314 is an endpoint within the network of contact center 320. Wired communications link 314 is "wired" with respect to wired communications link 316 omitting cellular communications link. It should be appreciated that wired communication device 314 (and optionally wired communication device 310) may comprise a WiFi, Bluetooth, or other local connectivity comprising radio frequency communications and, for purposes herein, remain a wired communication device when omitting cellular connectivity to network 106.

Contact center 320 may comprise server 322, such as to monitor calls. If a call comprising wired communication device 314 is unintentionally disconnected, server 322 may receive signal, such as a notification via an API or a polling result, indicating that the call was unintentionally disconnected and/or the unintentionally disconnected endpoint is now available to reestablish the call. For example, wired communication device 314 may have been inadvertently disconnected from network 106, such as due to an equipment fault. Once the fault is resolved and wired communication device 314 is returned to service, server 322 receives a signal and then proceeds to reestablish the call. Reestablishment may further comprise determining if each of the other endpoints (e.g., first mobile endpoint 302, second mobile endpoint 306, wired communication device 310) are currently connected to network 106 and, optionally, whether the users thereof agree to accept the reconnection—determined by configuration rule and/or a user response to a prompt announcing the call may be reconnected.

Figure 4:
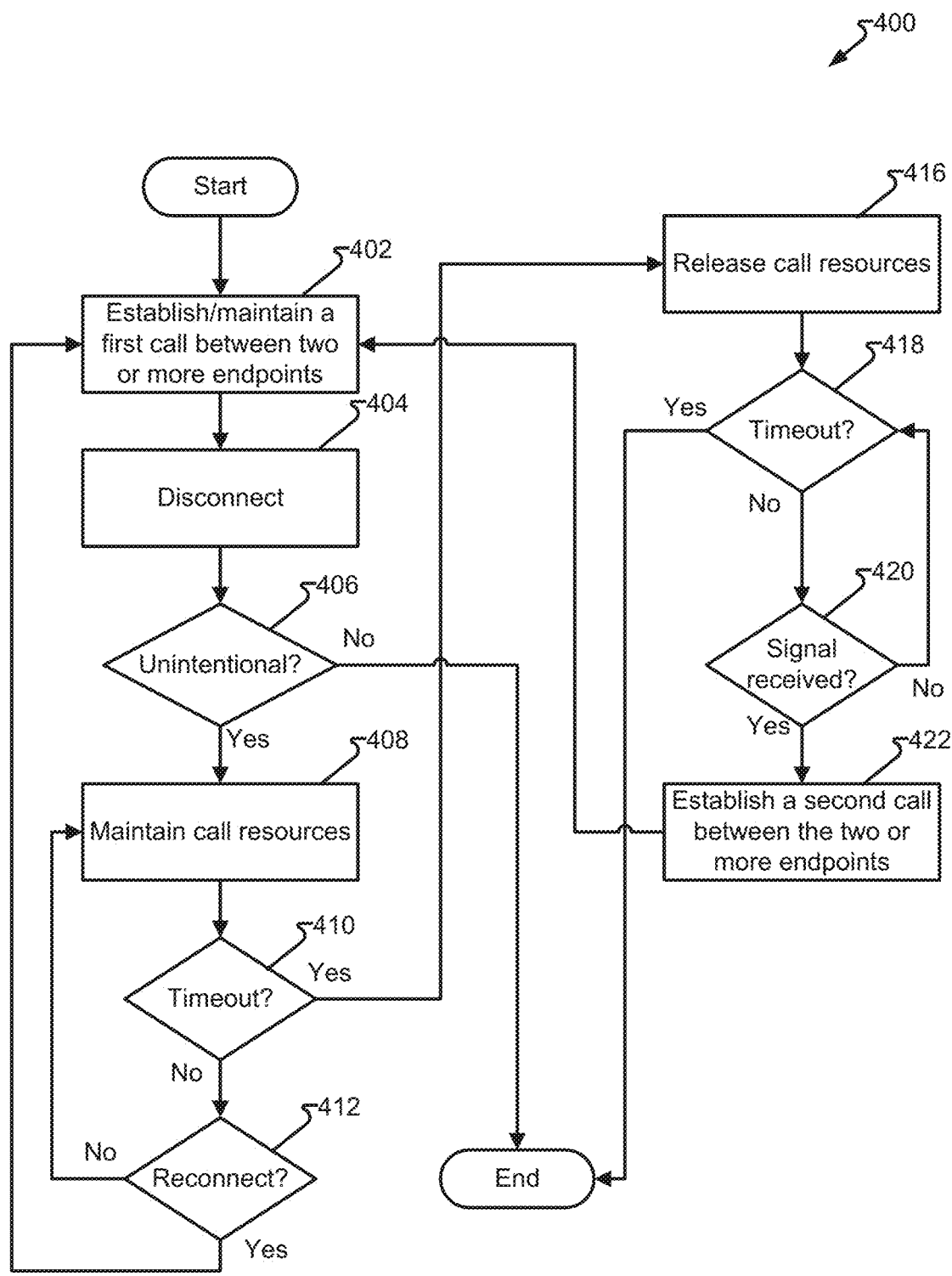
FIG. 4 depicts a process in accordance with embodiments of the present disclosure.

FIG. 4 depicts process 400 in accordance with embodiments of the present disclosure. In one embodiment, process 400 is embodied as machine-readable instructions that, when read by a processor, such as at least one processor of server 114, communication device 102, communication device 104, wired communication device 202, server 322, wired communication device 314, and/or other component of network 106, causes the processor to perform the steps of process 400.

Process 400 begins and, at step 402, a first call is established between two or more endpoints, such as communication device 104, communication device 102, and optionally additional wired and/or mobile communication devices. During the first call, step 404 is notified or determines that the first call was disconnected and test 406 determines whether the disconnect was unintentional. If test 406 is determined in the negative (i.e., the disconnect was intentional) process 400 may end or, optionally, if two or more endpoints remain connected to the first call, process 400 may loop back (not shown) to step 402 and call resources utilized by the disconnected endpoint are released.

If test 406 is determined in the affirmative, step 408 attempts to preserve system resources to maintain the call (as may be known in the prior art). If test 410 is determined in the negative (e.g., no timeout), processing proceeds to test 412 to determine if the first call has reconnected the (or all) unintentionally disconnected endpoints. If test 410 is determined in the affirmative (e.g., timeout), processing continues to step 416. Returning to test 412, if test 410 determines there has not been a timeout and test 412 is determined in the affirmative, then process 400 may loop back to 402 wherein the first call is maintained (i.e., call resources are maintained). If test 412 is determined in the negative, then the call resources are maintained in step 408.

If test 410 is determined in the affirmative, such as after five or ten seconds, step 416 releases the call resources utilized for the first call. Such resources are then made available for other purposes and the first call is deemed to have ended. Step 416 may also initiate a polling processes, such as to determine if the unintentionally disconnected endpoint has reconnected to the network. Next, test 418 determines if a second timeout condition has occurred, such as a duration for which reestablishing the call will be processed. If test 418 is determined in the affirmative, process 400 may end. If test 418 is determined in the negative, then process 400 proceeds to step 420 to determine if a signal has been received indicating the (or all) inadvertently disconnected endpoints from the first call have reconnected to the network. Step 420 may comprise receiving the signal is a result from polling (see step 416) that indicates the unintentionally disconnected endpoint has reconnected to the network. Optionally, step 420 may comprise indicia of acceptance by the users of each endpoint utilized in the first call. If such an indicia indicates refusal to establish the call (and as a further option such an endpoint is a required endpoint for the call), then process 400 may terminate. If test 420 is determined in the negative, processing may loop back to test 418. Otherwise, when test 420 is determined in the affirmative, processing continues to step 422. Step 422 may then reconnect the call between the two or more endpoints and process 400 loops back to step 402. Step 422 may also trigger notification to one or both endpoints that the call may now be reestablished.

Figure 5:
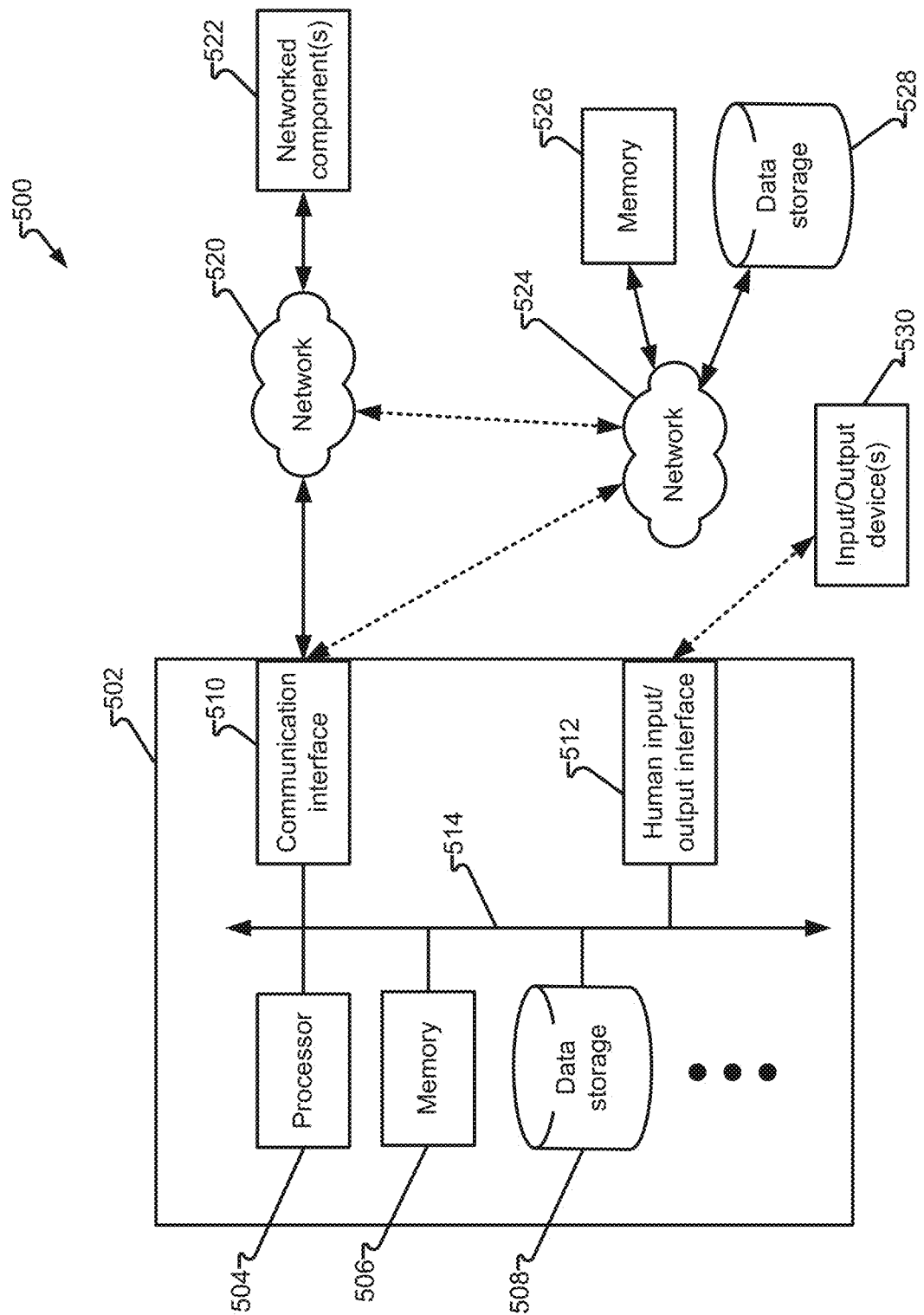
FIG. 5 depicts a system in accordance with embodiments of the present disclosure.

FIG. 5 depicts device 502 in system 500 in accordance with embodiments of the present disclosure. In one embodiment, server 114, communication device 102, communication device 104, wired communication device 202, server 322, first mobile endpoint 302, second mobile endpoint 306, wired communication device 310, and/or wired communication device 314 may be embodied, in whole or in part, as device 502 comprising various components and connections to other components and/or systems. The components are variously embodied and may comprise processor 504. The term "processor," as used herein, refers exclusively to electronic hardware components comprising electrical circuitry with connections (e.g., pin-outs) to convey encoded electrical signals to and from the electrical circuitry. Processor 504 may comprise programmable logic functionality, such as determined, at least in part, from accessing machine-readable instructions maintained in a non-transitory data storage, which may be embodied as circuitry, on-chip read-only memory, memory 506, data storage 508, etc., that cause the processor 504 to perform the steps of the instructions. Processor 504 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 514, executes instructions, and outputs data, again such as via bus 514. In other embodiments, processor 504 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 504 is a non-transitory computing device (e.g., electronic machine comprising circuitry and connections to communicate with other components and devices). Processor 504 may operate a virtual processor, such as to process machine instructions not native to the processor (e.g., translate the VAX operating system and VAX machine instruction code set into Intel® 9xx chipset code to enable VAX-specific applications to execute on a virtual VAX processor), however, as those of ordinary skill understand, such virtual processors are applications executed by hardware, more specifically, the underlying electrical circuitry and other hardware of the processor (e.g., processor 504). Processor 504 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 504, device 502 may utilize memory 506 and/or data storage 508 for the storage of accessible data, such as instructions, values, etc. Communication interface 510 facilitates communication with components, such as processor 504 via bus 514 with components not accessible via bus 514. Communication interface 510 may be embodied as a network port, card, cable, or other configured hardware device. Additionally or alternatively, human input/output interface 512 connects to one or more interface components to receive and/or present information (e.g., instructions, data, values, etc.) to and/or from a human and/or electronic device. Examples of input/output devices 530 that may be connected to input/output interface include, but are not limited to, keyboard, mouse, trackball, printers, displays, sensor, switch, relay, speaker, microphone, still and/or video camera, etc. In another embodiment, communication interface 510 may comprise, or be comprised by, human input/output interface 512. Communication interface 510 may be configured to communicate directly with a networked component or utilize one or more networks, such as network 520 and/or network 524.

Network 106 may be embodied, in whole or in part, as network 520. As described with respect to the preceding embodiments, network 520 may be embodied to comprise one or more of a wired network (e.g., Ethernet), wireless (e.g., WiFi, Bluetooth), mobile (e.g., cellular) network, or combination thereof and enable device 502 to communicate with networked component(s) 522. In other embodiments, network 520 may be embodied, in whole or in part, as a telephony network (e.g., public switched telephone network (PSTN), private branch exchange (PBX), cellular telephony network, etc.)

Additionally or alternatively, one or more other networks may be utilized. For example, network 524 may represent a second network, which may facilitate communication with components utilized by device 502. For example, network 524 may be an internal network to a business entity or other organization, such as contact center 320, whereby components are trusted (or at least more so) that networked components 522, which may be connected to network 520 comprising a public network (e.g., Internet) that may not be as trusted.

Components attached to network 524 may include memory 526, data storage 528, input/output device(s) 530, and/or other components that may be accessible to processor 504. For example, memory 526 and/or data storage 528 may supplement or supplant memory 506 and/or data storage 508 entirely or for a particular task or purpose. For example, memory 526 and/or data storage 528 may be an external data repository (e.g., server farm, array, "cloud," etc.) and enable device 502, and/or other devices, to access data thereon. Similarly, input/output device(s) 530 may be accessed by processor 504 via human input/output interface 512 and/or via communication interface 510 either directly, via network 524, via network 520 alone (not shown), or via networks 524 and 520. Each of memory 506, data storage 508, memory 526, data storage 528 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 530 may be a router, switch, port, or other communication component such that a particular output of processor 504 enables (or disables) input/output device 530, which may be associated with network 520 and/or network 524, to allow (or disallow) communications between two or more nodes on network 520 and/or network 524. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM1926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, smart phones, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method for non-real time reestablishment of an unintentionally disconnected call, comprising:
receiving a first signal indicating that a first call, between a mobile communication device and a second communication device, was unintentionally disconnected by the mobile communication device losing connectivity with a mobile communications network and real-time attempts to re-establish the first call have been terminated unsuccessfully;
after receiving the first signal, receiving a second signal indicating the mobile communication device is connected to the mobile communications network;
in response to receiving the second signal, initiating a reconnect process to establish a second call between the mobile communication device and the second communication device; and
after the first signal, periodically polling at least one of a mobile communications network component comprising a connectivity status for the mobile communication device or the mobile communication device to determine whether the mobile communication device has reconnected to the mobile communications network; and
wherein the second signal is received in response to determining that the mobile communication device has reconnected to the mobile communications network.

2. The method of claim 1, further comprising, upon receiving the second signal and before initiating the reconnect process, performing:
providing a notification to the second communication device that reconnection with the mobile communication device is possible;
upon receiving from the second communication device an approval to proceed with the reconnect process, initiating the reconnect process; and
upon receiving from the second communication device at least one of a disapproval to proceed with the reconnect process or an absence of a response to the notification for greater than a previously determined time period, terminating the reconnect process.

3. The method of claim 2, wherein the notification comprises presenting a generated message to the second communication device that identifies at least one of a party associated with the mobile communication device, a telephone number associated with the mobile communication device, or a time the unintentional disconnect of the mobile communication device occurred.

4. The method of claim 2, wherein the notification is provided as a text message to the second communication device.

5. The method of claim 1, further comprising, upon receiving the second signal and before initiating the reconnect process, performing:
providing a notification to the mobile communication device that reconnection with the second communication device is possible;
upon receiving from the mobile communication device an approval to proceed with the reconnect process, initiating the reconnect process; and
upon receiving from the mobile communication device at least one of a disapproval to proceed with the reconnect process or an absence of a response to the notification for greater than a previously determined time period, terminating the reconnect process.

6. The method of claim 1, further comprising, upon receiving the second signal and before initiating the reconnect process, performing:
after the first signal, periodically polling at least one of the mobile communications network component comprising a connectivity status for the second communication device or the second communication device to determine whether the second communication device is connected to the mobile communications network;
in response to determining the second communication device is not connected to the mobile communications network, periodically polling at least one of the mobile communications network component comprising a connectivity status for the second communication device or the second communication device to determine whether the second communication device has reconnected to the mobile communications network; and
upon the polling determining that the second communication device has reconnected to the mobile communications network, initiating the reconnect process.

7. A system for non-real time reestablishment of an unintentionally disconnected call, comprising:
a processor configured to execute instructions maintained in a non-transitory memory;
a network interface to a communications network; and
wherein the processor performs:
receiving, via the network interface, a first signal indicating that a first call, between a first communication device and a second communication device, was unintentionally disconnected by the first communication device losing connectivity with the communications network and real-time attempts to re-establish the first call have terminated unsuccessfully;
after receiving the first signal, receiving via the network interface a second signal indicating the first communication device has reestablished connectivity with the communications network; and
in response to receiving the second signal, initiating a reconnect process to establish a second call between the first communication device and the second communication device; and
wherein the processor, upon receiving the second signal and before initiating the reconnect process, performs:
providing a notification to the second communication device that reconnection with the first communication device is possible;
upon receiving from the second communication device an approval to proceed with the reconnect process, initiating the reconnect process; and
upon receiving from the second communication device at least one of a disapproval to proceed with the reconnect process or an absence of a response to the notification for greater than a previously determined time period, terminating the reconnect process.

8. The system of claim 7, further comprising:
a communications network component comprising a connectivity status for the first communication device; and
wherein the processor further performs:
after receiving the first signal, periodically polling at least one of a mobile communications network component of the communications network or the first communication device to determine whether the first communication device has reconnected to the communications network; and wherein the second signal is received in response to determining that the first communication device has reconnected to the communications network.

9. The system of claim 7, wherein the processor provides the notification further comprising the processor presenting a generated message to the second communication device that identifies at least one of a party associated with the first communication device, a telephone number associated with the first communication device, or a time the unintentional disconnect of the mobile communication device occurred.

10. The system of claim 9, wherein the notification is provided as a text message to the second communication device.

11. The system of claim 7, wherein the processor, upon receiving the second signal and before initiating the reconnect process, performs:
   providing a notification to the first communication device that reconnection with the second communication device is possible;
   upon receiving from the first communication device an approval to proceed with the reconnect process, initiating the reconnect process; and
   upon receiving from the first communication device at least one of a disapproval to proceed with the reconnect process or an absence of a response to the notification for greater than a previously determined time period, terminating the reconnect process.

12. The system of claim 7, wherein the processor, upon receiving the second signal and before initiating the reconnect process, performs:
   after the first signal, periodically polling at least one of a mobile communications network component of the communications network comprising a connectivity status for the second communication device or the second communication device to determine whether the second communication device is connected to the communications network;
   in response to determining the second communication device is not connected to the communications network, periodically polling at least one of the mobile communications network component comprising a connectivity status for the second communication device or the second communication device to determine whether the second communication device has reconnected to the communications network; and
   upon the polling determining that the second communication device has reconnected to the communications network, initiating the reconnect process.

13. A communication device, comprising:
   a network interface to a communications network; and
   a processor configured to execute instructions maintained in a non-transitory memory to perform:
      receiving a first signal indicating that a first call, between the communication device and a second communication device, was unintentionally disconnected by the network interface losing connectivity with the communications network and real-time attempts to re-establish the first call have been terminated unsuccessfully;
      after receiving the first signal, receiving a second signal indicating the network interface is connected to the communications network; and
      in response to receiving the second signal, initiating a reconnect process to establish a second call between the communication device and the second communication device; and wherein the processor performs the receiving of the second signal but before initiating the reconnect process, performs:
   after the first signal, periodically polling at least one of a communications network component of the communications network comprising a connectivity status for the second communication device or the second communication device to determine whether the second communication device is connected to the communications network;
   in response to determining the second communication device is not connected to the communications network, periodically polling at least one of the communications network component, comprising a connectivity status for the second communication device, or the second communication device to determine whether the second communication device has reconnected to the communications network; and
   upon the polling determining that the second communication device has reconnected to the communications network, initiating the reconnect process.

14. The communication device of claim 13, further comprising:
   a radio connectivity component of the network interface; and
   wherein the communication device comprises a mobile communication device;
   wherein the communications network comprises a mobile communications network; and
   wherein the processor further performs:
      after receiving the first signal, periodically polling the radio connectivity component to determine whether the mobile communication device has reconnected to the mobile communications network; and
      wherein the second signal is received in response to determining that the mobile communication device has reconnected to the mobile communications network.

15. The communication device of claim 13, wherein the processor further performs:
   upon receiving the second signal, providing a notification to the second communication device that reconnection with the communication device is possible;
   in response to the notification, receiving from the second communication device an approval to proceed with the reconnect process and initiating the reconnect process; and
   upon receiving from the second communication device indicating at least one of a disapproval to proceed with the reconnect process or an absence of a response to the notification for greater than a previously determined time period, terminating the reconnect process.

16. The communication device of claim 15, wherein the processor provides the notification further comprising the processor sending a generated message to the second communication device that identifies at least one of a party associated with the communication device, a telephone number associated with the communication device, or a time the unintentional disconnect of the mobile communication device occurred.

17. The communication device of claim 15, wherein the notification is provided as a text message to the second communication device.

18. The method of claim 2, wherein the notification is provided as a generated speech.

19. The system of claim 9, wherein the notification is provided as a generated speech.

20. The communication device of claim 15, wherein the notification is provided as a generated speech.

\* \* \* \* \*